(12) United States Patent
Hammerer

(10) Patent No.: US 8,522,632 B2
(45) Date of Patent: Sep. 3, 2013

(54) LINEAR GUIDE ASSEMBLY WITH RACK

(75) Inventor: Peter Hammerer, Bad Hindelang (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 1034 days.

(21) Appl. No.: 12/147,088

(22) Filed: Jun. 26, 2008

(65) Prior Publication Data

US 2009/0000409 A1 Jan. 1, 2009

(30) Foreign Application Priority Data

Jun. 29, 2007 (EP) .................................. 07012821

(51) Int. Cl.
*F16H 27/02* (2006.01)
*F16H 29/20* (2006.01)
*F16H 1/04* (2006.01)

(52) U.S. Cl.
USPC ........................................ 74/89.17; 74/422

(58) Field of Classification Search
USPC ............ 74/89.17, 422, 89.32; 72/449, 389.9; 212/319, 328; 108/143
See application file for complete search history.

(56) References Cited

U.S. PATENT DOCUMENTS

| | | | |
|---|---|---|---|
| 3,592,459 A | | 7/1971 | Golter et al. |
| 3,718,052 A | * | 2/1973 | Barr et al. ........................ 74/462 |
| 4,750,970 A | * | 6/1988 | Malosh ....................... 156/580.1 |
| 4,876,789 A | * | 10/1989 | Burwell ........................... 29/560 |
| 4,945,747 A | | 8/1990 | Yogo |
| 5,113,683 A | * | 5/1992 | Lafrasse ......................... 72/306 |
| 5,390,557 A | * | 2/1995 | Tsukada ...................... 74/89.17 |
| 5,546,826 A | * | 8/1996 | Yanagisawa ............... 74/490.09 |
| 5,548,989 A | * | 8/1996 | Howe et al. ..................... 72/298 |
| 5,582,070 A | * | 12/1996 | Dominguez ..................... 74/411 |
| 5,735,610 A | * | 4/1998 | Mark et al. ....................... 384/42 |
| 5,765,426 A | * | 6/1998 | Saegusa ......................... 72/306 |
| 5,934,141 A | * | 8/1999 | Costa ........................... 74/89.17 |
| 6,345,547 B1 | * | 2/2002 | Stoelinga et al. ............ 74/89.17 |
| 7,047,785 B2 | | 5/2006 | Peruzzo et al. |
| 7,082,798 B2 | | 8/2006 | Schmauder et al. |

FOREIGN PATENT DOCUMENTS

| | | |
|---|---|---|
| DE | 131 266 | 6/1901 |
| DE | 39 22 326 C2 | 11/1990 |
| DE | 10 2004 008 409 B3 | 8/2005 |
| DE | 601 14 303 T2 | 4/2006 |
| DE | 603 01 913 T2 | 7/2006 |
| EP | 0345 536 B1 | 12/1989 |
| EP | 1 166 911 B1 | 1/2002 |
| EP | 1 366 850 A1 | 12/2003 |
| EP | 1 380 362 A1 | 1/2004 |
| EP | 0 934 783 B1 | 5/2006 |
| JP | 02299724 | 12/1990 |

* cited by examiner

*Primary Examiner* — Alan Waits
(74) *Attorney, Agent, or Firm* — Douglas J. Christensen

(57) ABSTRACT

A linear guide comprising at least two stationarily supported guide bars, on which a guide block is mounted and which is longitudinally displaceable relative to the guide bars. The guide block is provided with a driving unit to generate a relative movement with respect to the guide bars, the driving unit comprising a pinion which meshes with the teeth of a toothed rack extending in parallel with the guide bars. The toothed rack is mounted only at its front and rear ends and is suspended in-between. A guiding element assigned to the pinion is mounted to the guide block so as to be displaceable in the longitudinal direction of the toothed rack on which it is supported in a form-locking manner. The guiding element engages over the toothed rack at the region opposite the mesh between the pinion and the teeth.

13 Claims, 3 Drawing Sheets

LINEAR GUIDE ASSEMBLY WITH RACK

PRIORITY

The current application claims the benefit of priority to European Patent Application No. 07012821.0 filed on Jun. 29, 2007. Said application is incorporated in its entirety by reference herein.

FIELD OF THE DISCLOSURE

The invention relates to the field of linear guides. More specifically, the invention is directed to a linear guide comprising at least two stationarily supported guide bars, on which a guide block is mounted. The guide block is longitudinally displaceable relative to the guide bars. The guide block is provided with a driving unit to generate relative movement with respect to the guide bars, the driving unit comprising a pinion which meshes with the teeth of a toothed rack extending in parallel with the guide bars.

BACKGROUND OF THE INVENTION

There are a number of patents that disclose bending machines and linear guides for the bending machines. For example, DE 39 22 326 C2 and EP 0 934 783 B1, respectively, disclose bending machines comprising two articulated robots, each of the robots being displaceable laterally of a gripping unit on a linear guide of a guiding path comprising two stationarily supported guide bars. The displacement is effected via a guide block that is longitudinally displaceable on the guide bars. Feeding is effected via a chain supported in the machine bed. However, the positioning accuracy of the chain drive is rather insufficient and the chain also tends to lengthen. Patent DE 603 01 913 T2 discloses a linear guide, wherein the guide blocks are displaced partially via toothed rack drives. In this case, the toothed rack is securely fixed, over its entire length, to a base body. A drive pinion, mounted to a carriage, rolls on the rack or, a securely mounted drive comprising a pinion moves a toothed rack, which is mounted to the carriage. In both cases, the alignment of the toothed rack guides is complex in the case of longer paths of displacement and can be obtained only with great difficulty due to the tolerances to be complied with. This requires very exact processing of the surfaces.

Further, patent DE 601 14 303 T2 discloses a linear guide for a collet feed in a pipe-bending machine, wherein guide bars are mounted above a plate and toothed racks are mounted below the plate, the toothed racks effecting the feed together with pinions arranged below the toothed racks. In this case, manufacturing, aligning and mounting the toothed rack and the linear guide requires a lot of work which, in addition, has to be carried out several times.

Patent DE 10 2004 008 409 B3, as well as EP 1 380 362 A1, disclose linear guides for a collet feed for pipe-bending machines, wherein a toothed rack, again fixed over its entire length, engages a corresponding driving pinion. This arrangement also requires a relatively large amount of manufacturing, aligning and mounting work associated with the toothed rack and the linear guide, which again has to be carried out several times.

Patent EP 1 366 850 A1 discloses a linear guide using a guide bar to which several toothed rack segments are mounted. When using such a linear guide in a processing machine, vibrations are transmitted from the drive to the guide bar, reducing the useful life of the guide bar quite considerably.

A linear guide of the above-mentioned type is disclosed in EP 0 345 536 B1 and uses guide bars in the form of round rack guides. One of the round rack guides is, at the same time, provided with teeth and serves as a linear guide and feeding element. The round rack guide is mounted over its entire length to a bearing rail, with the teeth being arranged laterally or on top. However, there is a disadvantage here in that round rack guides for longer paths of displacement (e.g. greater than 2 m) are not available.

In view thereof, there is a need to improve a linear guide of the above-mentioned type such that it can also be used, in a functionally reliable manner, for greater lengths of displacement (e.g. greater than 2 m) with particularly little mounting and aligning work.

SUMMARY OF THE INVENTION

According to one aspect of the invention, a linear guide that can be used in a functionally reliable manner for greater lengths is achieved by a linear guide, wherein the toothed rack is now mounted only at its front and rear ends and is suspended in-between. A guiding element, preferably in the form of a guiding carriage and assigned to the pinion, is further mounted to the guide block, the guiding element being displaceable in the longitudinal direction of the toothed rack on which it is supported in a form-locking manner and engaging over the toothed rack at the region opposite the mesh site between the pinion and the teeth.

In the linear guide according to one aspect of the invention, the guiding element or guiding carriage assigned to the pinion forms a type of counter-support by engaging over the toothed rack opposite the mesh site between the pinion and the teeth, while the pinion and the guiding element engage with one another, the counter-support being formed in the sense that, because the distance between the pinion and the guiding element remains unchanged at all times, the mesh between the pinion and the teeth is always effected at a defined distance from the guide block. The guide block itself is supported on the stationarily supported guide bars. This ensures that, although the toothed rack is mounted only at its front and rear ends and is freely suspended in-between, the distance from the toothed rack to the guiding carriage is always the same at the site of meshing, regardless of the guiding carriage's current position.

The suspended arrangement of the toothed rack avoids the necessity of laboriously manufacturing further mounting surfaces, in addition to the two mounting surfaces to which the stationarily supported guide bars carrying the guide block are mounted, and then having to exactly align the toothed rack thereon. The work of manufacture and mounting is considerably reduced in the linear guide according to the invention as compared to the known drive designs, and the linear guide according to the invention can also be used especially for long guiding paths, for which the manufacture, mounting and alignment of the toothed rack within the required tolerance range would result in quite a considerable amount of work.

Preferably, the overall arrangement of the linear guide, according to one aspect of the invention, is designed such that the toothed rack is arranged at a level, in the region where it meshes with the pinion, which corresponds to the level of its front and rear mounting points. This allows the guide block to be moved all the way to the two mounting points of the toothed rack without any problem.

In a further preferred embodiment of the invention, a further, second guiding element is mounted to the guide block with an offset from the first guiding element in the longitudinal direction of the toothed rack, the second guiding element also being displaceable along the toothed rack and being supported on the latter in a form-locking manner.

In another preferred embodiment of the linear guide according to the invention, the pinion and its assigned guiding element are mounted in a common housing to which the driving motor which drives the pinion is also mounted. This allows achievement of relatively good protection of the mesh site between the pinion and the driving unit against influences from the surroundings, and also allows mounting of the driving motor for the pinion below the guide block in a space-saving manner.

The form-locking support of the guiding element(s) on the toothed rack on which it/they also slide/s or on which it is/they are supported, can be achieved particularly preferably in that each guiding element has a substantially U-shaped cross-section, whose connecting leg is supported on the toothed rack, preferably by direct sliding contact on the top surface of the toothed rack, and whose lateral legs are supported on the lateral flanks of the toothed rack and which respectively comprise, at their free ends, a projection which is directed to the respective other lateral leg and engages in a form-locking manner in a longitudinal groove suitably provided on the toothed rack's lateral flank facing the projection. Thus, each guiding element is provided such that it engages over the toothed rack from above and laterally and is in form-locking engagement, at its lower ends, with the longitudinal grooves on both sides of the toothed rack. The engagement of each guiding element is such that longitudinal displacement of the guiding element along the toothed rack, but no lifting from the toothed rack, is possible.

If a guiding element is in direct sliding contact with the top surface of the toothed rack, the guiding element is preferably coated with a friction-reducing layer there, e.g. with a Teflon® layer.

In another preferred embodiment of the invention, the guiding elements are supported on the toothed rack via roller bearings or supporting rolls, allowing achievement of especially low frictional forces when displacing the guiding elements (rolling friction).

The toothed rack can preferably be designed so that it is formed from a linear guide bar, to whose bottom surface toothed rack segments are mounted, which form the toothing. In another, also preferred embodiment, the toothed rack can also be provided in the form of a round toothed rack. In this case, the mounting operation for connecting a linear guide bar to the toothed rack segments, which are to be mounted to the bottom surface of the guide bar, can be dispensed with completely.

The guiding element/s is/are preferably mounted to the bottom surface of the guide block. When providing the latter as a guide block which is displaceably supported on top of a portal, the guiding element/s is/are, however, preferably provided laterally of or above the guide block.

The linear guide according to the invention can be mounted to many types of machine tools or processing machines, e.g. to the base frame of a wire-, rod-, conduit- or pipe-processing machine, in particular a pipe- or wire-bending machine.

Further, in a linear guide according to the invention, a multiplicity of different units, which have to be displaced along a linear guide during operation of the machine, can be mounted to each guide block. However, preferably a bending robot or a rotary gripper is mounted to a guide block for the linear guide according to the invention. Of course, more than one guide block can be mounted to a linear guide of the invention.

BRIEF DESCRIPTION OF THE DRAWINGS

These as well as other objects and advantages of this invention, will be more completely understood and appreciated by referring to the following more detailed description of the presently preferred exemplary embodiments of the invention in conjunction with the accompanying drawings of which.

Figure 1:
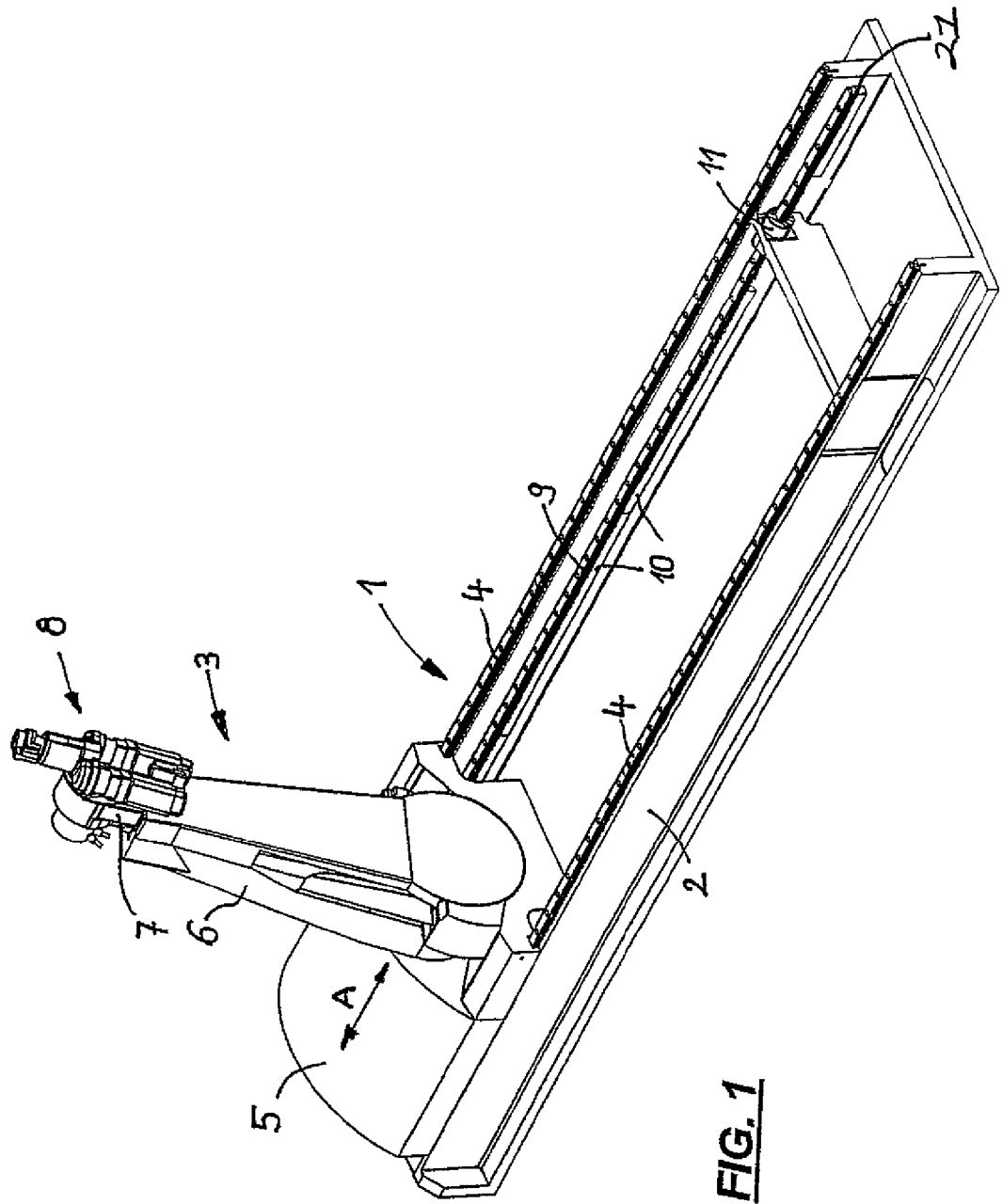
FIG. 1 shows a perspective top view of a linear guide according to the invention, on which a robot arm is displaceably guided.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE INVENTION

Referring to FIG. 1, there is shown a detailed view of a linear guide 1 for a bending machine, showing part of the base frame 2 of the bending machine as well as one of the bending robots 3 mounted to the bending machine. The bending robot 3 is arranged to be displaceable on the base frame 2 via two guide bars 4, which are mounted, over their entire length, to the base frame 2 or to corresponding supporting legs of the base frame 2, respectively. The bending robot 3 substantially consists of a guide block 5, a pivotable robot arm 6, as well as a bending head 8 mounted to a telescopic arm 7.

The bending robot 3 is displaceable in the longitudinal direction A of the base frame 2 along the guide bars 4 via the guide block 5, which carries the bending robot 3. A further guide bar 9 with toothed rack segments 10 mounted to its bottom surface is provided for displacement movement of the bending robot 3. The guide bar 9 with the toothed rack segments 10 mounted to the guide bar's bottom surface, compose the toothed rack 21. The front and rear ends of the guide bar 9 (more precisely, the front and rear ends of the path of displacement) are respectively mounted to the base frame 2 via a support bearing 11. The remainder of the guide bar 9 is suspended between the supporting locations provided by the two support bearings 11.

Figure 2:
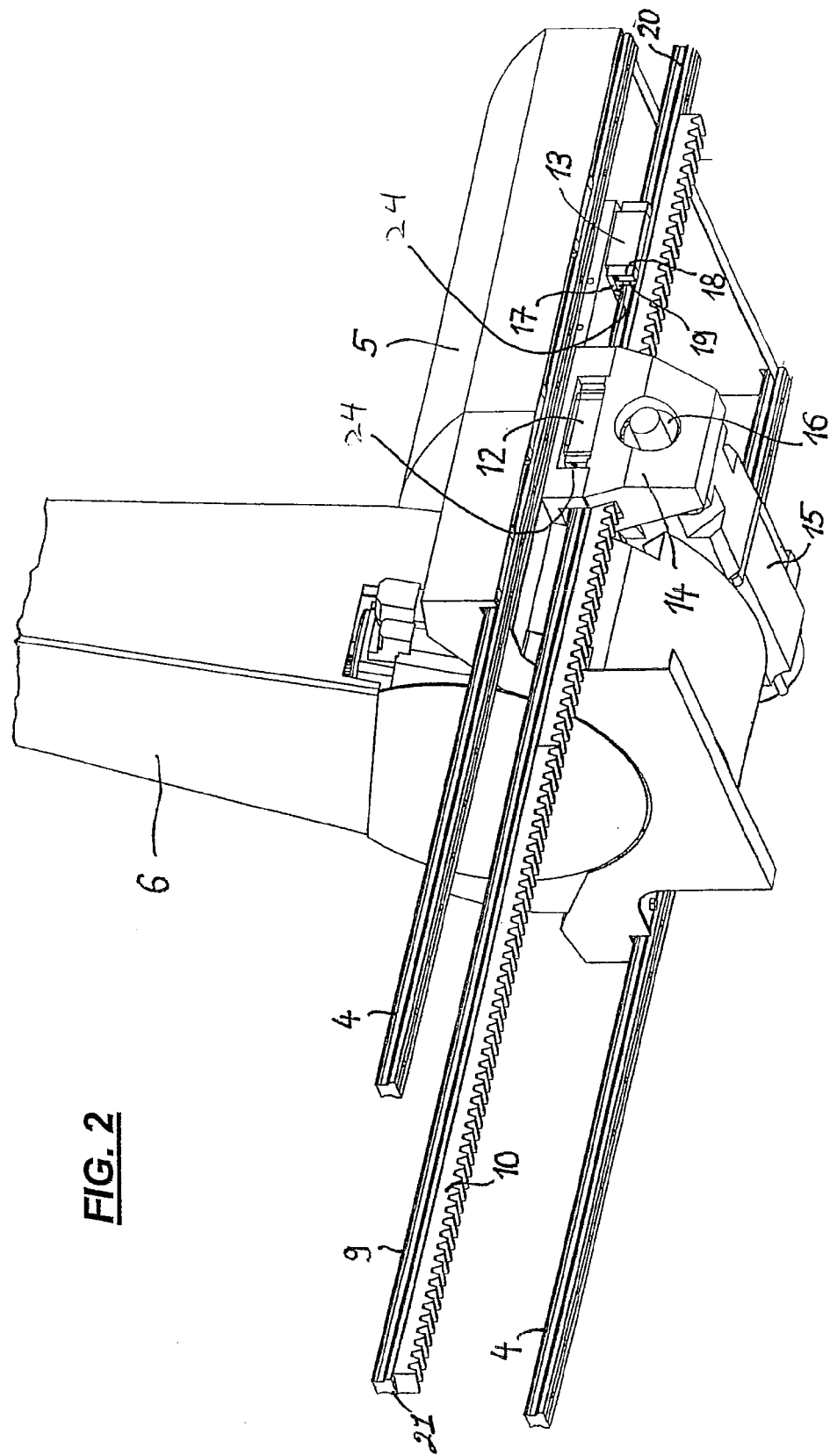
FIG. 2 shows an enlarged, oblique front/bottom perspective view of the carriage and its arrangement on the linear guide, according to FIG. 1.
Figure 3:
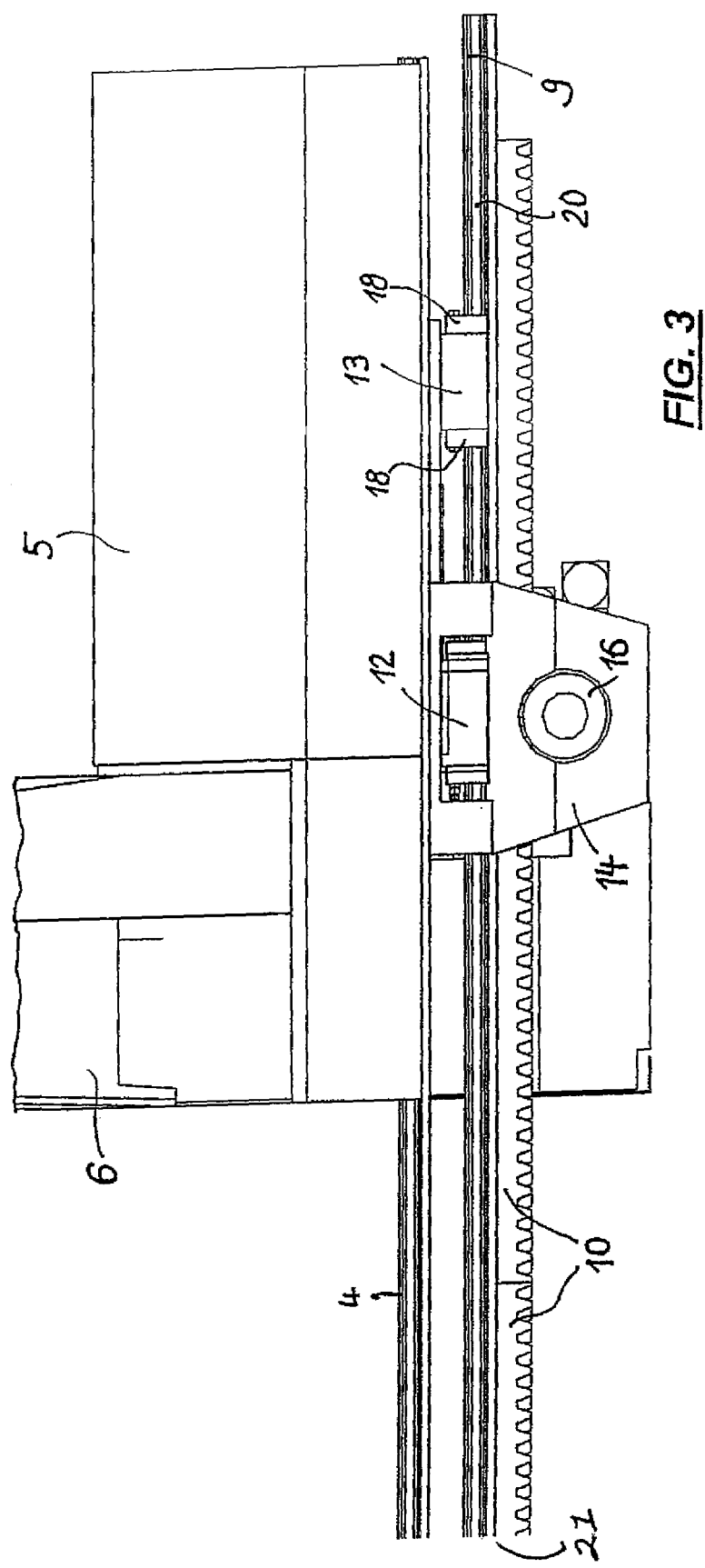
FIG. 3 shows a lateral view of a detail of the illustration of FIG. 2.

Now, FIG. 2 shows an enlarged, oblique bottom perspective view of a detail of the bending robot 3, comprising the feed drive. FIG. 3 shows the detail of FIG. 2, but in a lateral view, wherein the base frame 2 has been omitted for ease of illustration. The guide block 5 of the bending robot 3 is fitted on the guide bars 4, which are mounted to the base frame 2 as supporting guides. Mounted to the bottom surface of the guide block 5 are two guiding elements 12, 13, which are mutually offset in the longitudinal direction of the guide bar 9 by a predetermined distance, one such guiding element 12 is arranged in a housing 14.

The guiding elements 12, 13 are provided in the form of guiding carriages, which are supported, i.e. seated, on the top surface of the guide bar 9 and can be displaced along the guide bar 9 (which carries the toothed rack segments 10 at its bottom surface).

Further mounted to the housing 14 is a suitable motor 15 which drives the guide block 5 via a pinion 16 (shown only very schematically in FIG. 2), which meshes with the teeth of the toothed rack segments 10. The positions of the two guiding elements 12, 13 on the guide block 5 are selected such that the region of the toothed rack 21 in the housing 14, which is in mesh communication with the pinion 16, is on the same level of height as the support bearings 11.

When the motor 15 is turned on, the pinion 16 rolls on the toothed rack segments 10 and thereby moves the bending robot 3 in the longitudinal direction A of the base frame 2. As is evident from FIG. 2, the two guiding elements 12, 13 are U-shaped in cross-section so that they engage over the toothed rack 21 at the region of the latter, opposite the mesh between the pinion (16) and the teeth (10), and are thus displaceably supported by their respective upper connecting legs 17, on the side of the guide bar 9 opposite the toothed rack segments 10 (i.e. on the top surface of the guide bar 9). The contact can be a direct, sliding contact of the bottom surface of the connecting leg 17 of the corresponding guiding element 12 or 13, respectively, against the top surface of the guide bar 9. However, friction-reducing means can be additionally provided between the bottom surface of the connecting leg 17 of the respective guiding element 12 or 13 and the top surface of the guide bar 9; that is, a PTFE layer, or the arrangement of small roller bearings, rolls, or the like, which are sequentially arranged in the longitudinal direction of the guide bar.

As is evident in FIG. 2 for the guiding element 13, at least on one side of the guide bar 9 the guiding elements 12 and 13, with their U-shaped cross-sections, encompass the guide bar 9 at its lateral flanks via lateral legs 18, of which FIG. 2 only shows the lateral leg 18 on one side of the guiding element 13. The freely protruding end of each lateral leg 18 is provided with a projection 19, which is directed towards the opposite lateral leg and is in form-locking engagement (with a slight clearance) with a lateral groove 20 that is laterally provided on the guide bar 9 over the entire length of the guide bar 9.

Thus, the guiding elements 12 and 13 not only laterally encompass the guide bar 9, but the engagement of the projections 19 at the ends of the lateral legs 18 also allows for holding of each guiding element 12 or 13 to the guide bar 9, in that the respective guiding element 12, 13, which is displaceable along the guide bar 9, cannot be lifted off the guide bar 9 in a direction perpendicular to the direction of displacement. Thus, the two guiding elements 12 and 13 serve as additional regions of support for the suspended guide bar 9. This arrangement ensures that, even in case of a certain amount of sagging of the guide bar 9 with the toothed rack segments 10, the distance between the guide bar 9, with the toothed rack segments 10 mounted to it, and the guide block 5 as well as to the pinion 16, always remains the same in the driving region, regardless of the current position of the guide block 5.

As is evident from the described construction, the guiding element 12 is assigned to the pinion 16 of the drive within the housing 14 such that the guiding element 12 is mounted on the guide bar 9 opposite the region of mesh between the pinion 16 and the toothed rack 10 and is in sliding contact with the top surface of the guide bar 9, either directly by its connecting leg or, as already described above, friction-reducing means, e.g. a Teflon® layer 24, roller bearings 25, or rolls, and the like, are additionally provided between the connecting leg 17 and the top surface of the guide bar 9. Via these means the guiding element 12 is supported on the top surface of the guide bar 9 during displacement along the guide bar 9. Thus, the guiding element 12 forms a kind of upper thrust bearing above the site of mesh between the pinion 16 and the toothed rack segments 10.

Due to the suspended arrangement of the guide bar 9 between its two support bearings 11, particularly easy mounting of the linear guide according to the invention is possible. Simpler manufacturing is possible, as compared to known solutions, because there is actually no need here for mounting the toothed rack 21 to the base frame 2 over the entire length of the toothed rack 21, within the required tolerance range. Known solutions require complex and difficult alignment of the guide bar 9 with the toothed rack segments 10 mounted to it.

Instead of the shapes of the guide bars 4 and 9 shown in the Figures, it is also possible to use round guides, in which case a round toothed rack can be used here instead of the guide bar 9 with the toothed rack segments 10 mounted to it. It is also possible, of course, to use, for example, the guide bars 4 in the form shown in the Figures and to replace only the guide bar 9 and its toothed rack segments 10 with a round toothed rack.

The linear guide arrangement shown in the Figures can also be used for relatively large paths of displacement (e.g. paths of displacement of approximately 3.2 m) without any problem.

Although specific examples have been illustrated and described herein, it will be appreciated by those of ordinary skill in the art that any arrangement calculated to achieve the same purpose could be substituted for the specific examples shown. This application is intended to cove adaptations or variations of the present subject matter. Therefore, it is intended that the invention be defined by the attached claims and their legal equivalents.

I claim:

1. A linear guide comprising:
   a base frame having a front end and a back end;
   two stationary supported parallel guide bars, each guide bar having a front end and a rear end, each guide bar mounted to and supported by the base frame at each of said front ends, each of said rear ends and intermediate the front ends and rear ends,
   a guide block, the guide block is mounted on the guide bars and longitudinally displaceable relative to the guide bars,
   a further guide bar with a toothed rack extending parallel with the at least two stationary parallel supported guide bars and positioned intermediate and below the two stationary supported parallel guide bars and below the guide block, the further guide bar having teeth of the toothed rack extending downwardly; the further guide bar with the toothed rack comprising a front end and a rear end, wherein only the front end and rear end of the further guide bar with the toothed rack are respectively connected to and supported by the base frame, and the remainder of the further guide bar with the toothed rack being freely suspended with respect to the base frame between the front end and the rear end;
   a driving unit comprising a motor and pinion for moving the guide block with respect to the guide bars, the driving unit being attached to the guide block beneath the guide block at a bottom surface of the guide block and positioned between the two stationary supported parallel guide bars, the motor mounted transverse to the two stationary supported parallel guide bars, the pinion meshing with the downwardly extending teeth of the toothed rack.

2. The linear guide of claim 1, wherein the freely suspended further guide bar and the toothed rack is located at a level of height, in the region of mesh with the pinion, corresponding to a level of height of a front end mounting location and a rear end mounting location of the toothed rack.

3. The linear guide of claim 2 wherein a guiding element is mounted to the bottom surface of the guide block and supported on the further guide bar and toothed rack in a form-locking manner.

4. The linear guide of claim 3, wherein the driving unit rotating the pinion is mounted to a housing of the guiding element.

5. The linear guide of claim 3, wherein the guiding element is supported on the toothed rack in direct sliding contact with a top surface of the toothed rack.

6. The linear guide as claimed in claim 5, wherein the guiding element is provided with a friction-reducing layer facing the top surface of the toothed rack.

7. The linear guide of claim 3, wherein the guiding element is supported on a top surface of the toothed rack.

8. The linear guide of claim 1, wherein a bending robot or a rotary gripper is mounted to the guide block.

9. The linear guide of claim 1, wherein the base frame is the base frame of a pipe- or wire-bending machine.

10. A linear guide comprising:
a base frame having a front end and a back end;
at least two stationary supported parallel guide bars, each guide bar having a front end and a rear end, each guide bar mounted to and supported by the base frame by base frame supporting legs;
a guiding carriage mounted on the guide bars and longitudinally displaceable relative to the guide bars; and
a further guide bar with a toothed rack extending parallel with the at least two stationary parallel supported guide bars and said further guide bar positioned intermediate and below the two stationary supported parallel guide bars, the further guide bar and toothed rack having a front end supported by the base frame and a rear end supported by the base frame and teeth of said toothed rack extending downwardly, the front and rear ends defining the path of displacement of the guiding carriage, the further guide bar and toothed rack unsupported by the base frame intermediate the front and rear ends, the further guide bar with the toothed rack supported by the base frame at the front end by way of a cross member extending transverse to the two stationary supported parallel guide bars;
wherein the guiding carriage being in form-locking engagement with the further guide bar and the toothed rack, the guiding carriage further having a drive motor and a pinion engaged with the tooth rack, the drive motor extending horizontally at the bottom of the guiding carriage and positioned intermediate and transvers to the parallel guide bars.

11. The linear guide of claim 10 wherein the guiding carriage holds a bending robot.

12. The linear guide of claim 10 wherein the guiding carriage holds a pipe bending machine.

13. The linear guide of claim 10 wherein the guiding carriage holds a wire bending machine.

* * * * *